(12) United States Patent
Hiraga (10) Patent No.: US 10,391,571 B2
(45) Date of Patent: Aug. 27, 2019

(54) WIRE ELECTRIC DISCHARGE MACHINE CONTROLLER HAVING WIRE ELECTRODE REPLACEMENT FUNCTION

(71) Applicant: FANUC Corporation, Yamanashi (JP)

(72) Inventor: Kaoru Hiraga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 164 days.

(21) Appl. No.: 14/950,297

(22) Filed: Nov. 24, 2015

(65) Prior Publication Data

US 2016/0158863 A1 Jun. 9, 2016

(30) Foreign Application Priority Data

Dec. 9, 2014 (JP) .................................. 2014-248751

(51) Int. Cl.
*B23H 7/10* (2006.01)
*B23H 1/04* (2006.01)
(Continued)

(52) U.S. Cl.
CPC ................. *B23H 7/10* (2013.01); *B23H 1/10* (2013.01); *B23H 11/00* (2013.01); *G05B 19/188* (2013.01);
(Continued)

(58) Field of Classification Search
CPC ... B23H 7/02; B23H 7/06; B23H 7/10; B23H 7/20; B23H 7/65; B23H 7/102;
(Continued)

(56) References Cited

U.S. PATENT DOCUMENTS 4,581,514 A * 4/1986 Inoue ....................... B23H 7/10
                                                             204/225
4,689,457 A * 8/1987 Izumiya ................... B23H 7/10
                                                             219/69.12
(Continued)

FOREIGN PATENT DOCUMENTS

CN          1402658 A       3/2003
JP          61-121832 A     6/1986
(Continued)

OTHER PUBLICATIONS

Azuma, Izumi, JPH01264722A, Wire Cut Electric Discharge Machining System, Oct. 23, 1989, Espacenet translation, Description. (Year: 1989).*

(Continued)

*Primary Examiner* — Tu B Hoang
*Assistant Examiner* — Masahiko Muranami
(74) *Attorney, Agent, or Firm* — Hauptman Ham, LLP (57) ABSTRACT

A controller for controlling a wire electric discharge machine is configured to monitor the remaining lifetime of a wire electrode and calculates an electric discharge machining time, thereby determining the timing of replacement of the wire electrode, so that it can recognize the timing of interruption of electric discharge machining. Consequently, a program operation can be suspended and the wire electrode can be cut and automatically replaced at that timing. After the replacement of the wire electrode, moreover, the wire electrode can be connected and the program operation can be restarted.

5 Claims, 5 Drawing Sheets

(51) Int. Cl.
*B23H 1/06* (2006.01)
*B23H 1/10* (2006.01)
*B23H 11/00* (2006.01)
*G05B 19/18* (2006.01)
*B23H 7/20* (2006.01)
*G05B 19/4065* (2006.01)

(52) U.S. Cl.
CPC ............ *B23H 7/20* (2013.01); *G05B 19/4065* (2013.01); *G05B 2219/45043* (2013.01)

(58) Field of Classification Search
CPC ........ B23H 1/10; B23H 11/00; G05B 19/188; G05B 2219/45043; G05B 19/418; G06Q 50/04; G06Q 50/00; G06F 9/46; G06F 3/048; G06N 5/02
USPC ........... 219/69.15, 69.12, 69.16, 69.17, 69.1; 700/162, 159, 160, 178, 177, 184, 192, 700/193
See application file for complete search history.

(56) References Cited

U.S. PATENT DOCUMENTS

| | | | | |
|---|---|---|---|---|
| 4,998,003 | A * | 3/1991 | Kawanabe | B23H 7/10 219/69.12 |
| 5,072,089 | A * | 12/1991 | Higashi | B23H 7/02 219/69.12 |
| 5,081,332 | A * | 1/1992 | Sakuragawa | B23H 1/10 219/69.12 |
| 5,506,381 | A * | 4/1996 | Matsushima | B23H 7/10 206/388 |
| 5,753,880 | A * | 5/1998 | Kajitori | B23H 7/102 219/69.12 |
| 5,914,054 | A | 6/1999 | Ito et al. | |
| 6,278,075 | B1 * | 8/2001 | Kamiguchi | B23H 7/04 219/69.12 |
| 6,713,705 | B1 | 3/2004 | Satou et al. | |
| 2002/0002417 | A1 * | 1/2002 | Irie | B23H 7/065 700/162 |
| 2004/0172154 | A1 * | 9/2004 | Maki | B23H 7/065 700/162 |
| 2008/0173618 | A1 | 7/2008 | Chen et al. | |
| 2015/0202701 | A1 | 7/2015 | Hara | |

FOREIGN PATENT DOCUMENTS

| | | | | |
|---|---|---|---|---|
| JP | 63-260723 | A | 10/1988 | |
| JP | 64-11725 | A | 1/1989 | |
| JP | H01-264722 | * | 10/1989 | ............... B23H 7/02 |
| JP | 2-41821 | A | 2/1990 | |
| JP | 2-237724 | A | 9/1990 | |
| JP | H07-266137 | A | 10/1995 | |
| JP | H08-118151 | A | 5/1996 | |
| JP | H09-216129 | A | 8/1997 | |
| JP | 2003-025155 | A | 1/2003 | |
| JP | 2003025155 | A * | 1/2003 | ............... B23H 7/02 |
| JP | 2006-247755 | A | 9/2006 | |
| JP | 2010-179377 | A | 8/2010 | |
| JP | 5507024 | B1 * | 5/2014 | ............... B23H 1/02 |
| JP | 5507024 | B1 | 5/2014 | |
| TW | 200831223 | A | 8/2008 | |

OTHER PUBLICATIONS

Hara, Masayuki, Wire Discharge Machining Apparatus, May 2014, translation of JP application, description (Year: 2014).*
Office Action in JP Application No. 2014-248751, dated Mar. 1, 2016.
Extended European Search Report in EP Application No. 15197950.7, dated Apr. 11, 2016.
Office Action in CN Application No. 201510889152.6, dated Jun. 15, 2017.

* cited by examiner

MAIN PROGRAM 1
O1000;
M60;           ···WIRE CONNECTION
M98P100;
M50;           ···WIRE CUTTING
G00X15.0;

M60;           ···WIRE CONNECTION
M98P100;
M50;           ···WIRE CUTTING
G00X15.0;

M60;           ···WIRE CONNECTION
M98P100;
M50;           ···WIRE CUTTING
G00X15.0;

M60;           ···WIRE CONNECTION
M98P100;
M50;           ···WIRE CUTTING
M30;

SUB-PROGRAM 1
O100;
S1D1;          ··· 1ST MACHINING CONDITION, OFFSET SETTING
M98P110;       ··· CALL SUB-PROGRAM 2
M01;           ··· OPTIONAL STOP

S2D2;          ··· 2nd MACHINING CONDITION, OFFSET SETTING
M98P110;       ··· CALL SUB-PROGRAM 2
M01;           ··· OPTIONAL STOP

S3D3;          ··· 3rd MACHINING CONDITION, OFFSET SETTING
M98P110;       ··· CALL SUB-PROGRAM 2
M01;           ··· OPTIONAL STOP
M99;

SUB-PROGRAM 2
O110;
G92X0.0Y0.0;   ···COORDINATE SYSTEM SETTING
G91G01G42Y-4.0;
X-5.0;
Y8.0;
X10.0;         ···CUTTING FEED
Y-8.0;            (ELECTRIC DISCHARGE
X-5.0;             MACHINING INTERVAL)
G40Y4.0;
M99;

FIG.5

MAIN PROGRAM 1
O2000;
S1D1;          ··· 1ST MACHINING CONDITION, OFFSET SETTING
M98P200;
G00X-45.0;

S2D2;
M98P200;       ··· 2nd MACHINING CONDITION, OFFSET SETTING
G00X-45.0;

S3D3;
M98P200;       ··· 3rd MACHINING CONDITION, OFFSET SETTING
M30;

SUB-PROGRAM 1
O200;
M60;           ··· WIRE CONNECTION
M98P220;       ··· CALL SUB-PROGRAM 2
M50;           ··· WIRE CUTTING
M01;           ··· OPTIONAL STOP
G00X15.0;

M60;           ··· WIRE CONNECTION
M98P220;       ··· CALL SUB-PROGRAM 2
M50;           ··· WIRE CUTTING
M01;           ··· OPTIONAL STOP
G00X15.0;

M60;           ··· WIRE CONNECTION
M98P220;       ··· CALL SUB-PROGRAM 2
M50;           ··· WIRE CUTTING
M01;           ··· OPTIONAL STOP
G00X15.0;

M60;           ··· WIRE CONNECTION
M98P220;       ··· CALL SUB-PROGRAM 2
M50;           ··· WIRE CUTTING
M01;           ··· OPTIONAL STOP
M99;

SUB-PROGRAM 2
O220;
G92X0.0Y0.0;   ···COORDINATE SYSTEM SETTING
G91G01G42Y-4.0;
X-5.0;
Y8.0;
X10.0;         ···CUTTING FEED
Y-8.0;            (ELECTRIC DISCHARGE
X-5.0;            MACHINING INTERVAL)
G40Y4.0;
M99;

FIG.6

WIRE ELECTRIC DISCHARGE MACHINE CONTROLLER HAVING WIRE ELECTRODE REPLACEMENT FUNCTION

RELATED APPLICATIONS

The present application claims priority to Japanese Application Number 2014-248751, filed Dec. 9, 2014, the disclosure of which is hereby incorporated by reference herein in its entirety.

BACKGROUND OF THE INVENTION

Field of the Invention

The present invention relates to a wire electric discharge machine controller having a wire electrode replacement function.

Description of the Related Art

In incorporating a wire electric discharge machine into a mass-production machining line of a manufacturing plant, a prolonged continuous operation is required to improve the productivity. In this case, a wire electric discharge system is employed comprising workpiece replacement means for automatically replacing workpieces. If various consumable parts of the wire electric discharge machine having reached their life limit require replacement, however, the continuous operation must be temporarily stopped and restarted after the consumable parts are manually replaced. This retards the prolonged, continuous automatic operation, thus hindering an improvement in the productivity.

Conventional techniques have been devised to detect the expiration of the life of a wire electrode of a wire electric discharge machine and the remaining lifetime of the wire electrode. According to these techniques, however, an indication to the effect that the replacement timing for the wire electrode is reached is displayed on a display device to urge an operator to replace the wire electrode.

Japanese Patent Application Laid-Open No. 2010-179377 discloses a technique for a wire electric discharge machine in which the remaining amount of a wire is detected based on a detected value of the wire tension. According to this technique, a machining program is analyzed to obtain a necessary wire length for workpiece machining before the machining, the necessity of wire bobbin replacement is determined by comparing the obtained wire length and the detected remaining amount of the wire, and the result of the determination is displayed on a display device.

Japanese Patent Application Laid-Open No. 2003-25155 discloses a wire electric discharge machine configured to calculate the remaining amount of a wire, calculate the consumption of the wire for each machining condition unit by analyzing a machining program, and report the points of wire cutting and wire electrode replacement by comparing the remaining amount and the consumption.

Japanese Patent Application Laid-Open No. 9-216129 discloses an electric discharge machine furnished with a workpiece handling robot for taking out a workpiece and a core, in which the workpiece handling robot is disposed outside a machining tank.

Japanese Patent Application Laid-Open No. 8-118151 discloses a wire electric discharge machine configured to automatically replace a head comprising a power feeder (electrode pin) and a wire guide. In this machine, the durable time of the power feeder is previously registered so that the head can be replaced with machining temporarily stopped when the durable time is exceeded by the operating time of the machine.

Japanese Patent Application Laid-Open No. 7-266137 discloses a wire electric discharge machine comprising a workpiece changer that is provided with drying means and rustproof means for machined workpieces.

SUMMARY OF THE INVENTION

An automatic operation in wire electric discharge machining is hindered by the problem that if the electric discharge machining is suspended, a machined surface is inevitably streaked and hence reduced in quality at the restart of machining. This is a problem caused by a discontinuous electric discharge state due to, for example, a temporary short circuit between a wire electrode and a workpiece at the restart of the machining. Because of this problem, the wire electrode cannot be easily replaced even when the timing of its replacement is reached. As a matter of fact, therefore, an operator used to replace the wire electrode by appropriately estimating the timing when the electric discharge machining is interrupted, with reference to the display on the display device. Thus, the replacement of the wire electrode requires a manual operation, which retards the prolonged, continuous automatic operation and hinders an improvement in the productivity.

In the wire electric discharge machine described in Japanese Patent Application Laid-Open No. 2010-179377, the wire length is obtained by analyzing the machining program to determine the necessity of the wire bobbin replacement. Since the wire bobbin is supposed to be replaced by an operator, the necessity of the wire bobbin replacement is determined before the machining. If the wire bobbin is replaced at this timing, the wire electric discharge machining that often takes 10 hours or more suffers a substantial wire disposal loss and lacks in efficiency. Due to the operator's replacement, moreover, this system is not suitable for the prolonged, continuous automatic operation and has no effect to improve the productivity.

In the wire electric discharge machine described in Japanese Patent Application Laid-Open No. 2003-25155, the machining program is analyzed and the wire electrode replacement point is reported for each machining condition unit. In contrast, in the present invention, as described later, the wire electrode replacement timing is determined for each electric discharge interval, so that the technique of the invention is different from that described in this patent document. Since the technique of this patent document is based on the assumption that the wire is replaced by an operator, moreover, it is neither designed to replace the wire electrode nor to restart a program operation after the replacement. Since this system is not suitable for the prolonged, continuous automatic operation, therefore, it has no significant effect to improve the productivity.

Although the electric discharge machine described in Japanese Patent Application Laid-Open No. 9-216129 comprises means for replacing a workpiece, it is not configured to replace a wire electrode.

The wire electric discharge machine described in Japanese Patent Application Laid-Open No. 8-118151, unlike that of the present invention described later, is configured to determine the head replacement timing from its operating time and the previously registered durable time of the power feeder. Specifically, a problem occurs that if the head is replaced, the electric discharge machining is temporarily stopped in the middle, so that the machined surface is streaked and reduced in quality at the restart of the machining. Since the wire electric discharge machine of the present invention described later is configured so that the electric discharge machining cannot be stopped in the middle, it can solve the problem that the machined surface is streaked and reduced in quality at the restart of the machining.

Although the wire electric discharge machine described in Japanese Patent Application Laid-Open No. 7-266137 comprises the drying means, rustproof means, and replacement means for workpieces, it is not configured to replace a wire electrode.

Accordingly, the object of the present invention is to provide a wire electric discharge machine controller having a wire electrode replacement function such that a wire electrode can be replaced without stopping a continuous operation and without requiring a manual operation when the timing of replacement of the wire electrode is reached, based on attention to the wire electrode among the other consumable parts of a wire electric discharge machine.

In order to achieve the above object, a wire electric discharge machine controller according to the present invention comprises a wire remaining lifetime monitoring unit, electric discharge machining time calculation unit, and wire electrode replacement timing determination unit, whereby the timing of interruption of electric discharge machining can be recognized. Thus, the controller can order suspension of a program operation, cutting of the wire electrode, and automatic replacement of the wire electrode by wire electrode replacement unit at that timing. After the replacement of the wire electrode, moreover, connection of the wire electrode and restart of the program operation can be ordered.

The electric discharge machine controller according to the present invention is configured to create a machining path based on an axis movement command from a machining program and perform a program operation according to the machining program to move a wire electrode and a workpiece relative to each other along the created machining path, and comprises a program operation control unit configured to execute the machining program, a wire remaining lifetime monitoring unit configured to monitor the remaining lifetime of the wire electrode, an electric discharge machining time calculation unit configured to analyze the machining program and calculate, before the start of electric discharge, an electric discharge machining time in a machining interval before the electric discharge is stopped, a wire electrode replacement timing determination unit configured to compare the remaining lifetime and the electric discharge machining time and determine that the timing of replacement of the wire electrode is reached if the remaining lifetime of the wire electrode is shorter than the electric discharge machining time, a program operation stop command unit configured to output a stop command for the program operation to the program operation control unit when the replacement timing for the wire electrode is reached, a wire cutting control unit configured to output a cutting command for the wire electrode to a wire cutting unit and monitor the completion of cutting of the wire electrode, a wire electrode replacement control unit configured to output a replacement command for the wire electrode to a wire electrode replacement unit and monitor the completion of replacement of the wire electrode, a wire connection control unit configured to output a connection command for the wire electrode to a wire connection unit and monitor the completion of connection of the wire electrode when the replacement of the wire electrode is completed, and a program operation restart command unit configured to output a restart command for the program operation to the program operation control unit when the connection of the wire electrode is completed.

The wire electrode replacement timing determination unit may calculate the ratio between the remaining lifetime and the electric discharge machining time and determine that the timing of replacement of the wire electrode is reached if the calculated ratio is smaller than a predetermined value.

The wire electrode replacement timing determination unit may calculate the difference between the remaining lifetime and the electric discharge machining time and determine that the timing of replacement of the wire electrode is reached if the calculated difference is smaller than a predetermined value.

The wire electrode replacement unit may be a robot.

According to the present invention, there can be provided a wire electric discharge machine controller having a wire electrode replacement function such that automatic wire replacement by wire electrode replacement unit can be achieved without the fear of degrading the machined surface quality, no operator is required for the wire electrode replacement, and a program operation can be restarted after the wire electrode replacement, so that a dramatic improvement can be expected of the productivity of wire electric discharge machining.

BRIEF DESCRIPTION OF THE DRAWINGS

The above and other objects and features of the present invention will be obvious from the ensuing description of embodiments with reference to the accompanying drawings, in which:

FIG. 1 also shows a wire electrode 36 cutting the workpiece 35;

DETAILED DESCRIPTION OF THE PREFERRED EMBODIMENTS

One embodiment of a wire electric discharge machine controller having a wire electrode replacement function according to the present invention will be described with reference to FIG. 1.

A wire electric discharge machine controller 10 creates a machining path based on an axis movement command from a machining program and operates a wire electric discharge machine according to the machining program to move a wire electrode and a workpiece relative to each other along the created machining path, thereby machining the workpiece.

The wire electric discharge machine controller 10 comprises a program operation control unit 16, wire remaining lifetime monitoring unit 11, electric discharge machining time calculation unit 12, wire electrode replacement timing determination unit 13, program operation stop command unit 14, wire cutting control unit 17, wire electrode replacement control unit 18, wire connection control unit 19, and program operation restart command unit 15. The program operation control unit 16 executes the machining program. The wire remaining lifetime monitoring unit 11 monitors the remaining lifetime of the wire electrode. The electric discharge machining time calculation unit 12 analyzes the machining program and calculates, before the start of electric discharge, an electric discharge machining time in a machining interval before the electric discharge is stopped. The wire electrode replacement timing determination unit 13 determines that the timing of replacement of the wire electrode is reached if the remaining lifetime of the wire electrode is found by comparison to be shorter than the electric discharge machining time. The program operation stop command unit 14 outputs a command for stopping a program operation to the program operation control unit 16 when the replacement timing is reached. The wire cutting control unit 17 outputs a command for cutting the wire electrode to a wire cutting unit 20 and monitors the completion of cutting of the wire electrode. The wire electrode replacement control unit 18 outputs a command for replacing the wire electrode to wire electrode replacement unit 21 and monitors the completion of replacement of the wire electrode. The wire connection control unit 19 outputs a command for connecting the wire electrode to a wire connection unit 22 and monitors the completion of connection of the wire electrode when the replacement of the wire electrode is completed. The program operation restart command unit 15 outputs a command for restarting the program operation to the program operation control unit 16 when the connection of the wire electrode is completed.

The wire electrode replacement timing determination unit 13 has a function of calculating the ratio between the remaining lifetime of the wire electrode and the electric discharge machining time and determining that the timing of replacement of the wire electrode is reached if the calculated ratio is smaller than a predetermined value.

Alternatively, the wire electrode replacement timing determination unit 13 may have a function of calculating the difference between the remaining lifetime of the wire electrode and the electric discharge machining time and determining that the timing of replacement of the wire electrode is reached if the calculated difference is smaller than a predetermined value. Further, a robot may be employed as the wire electrode replacement unit.

The following is a description of elements of the wire electric discharge machine controller 10.

<Wire Electrode>

The wire electrode used in the wire electric discharge machine is a wire-like electrode that serves to generate electric discharge. A wire wound on a bobbin in the wire electric discharge machine is drawn out, electrically discharged, and collected directly into a collection box or the like for disposal. The remaining lifetime of the wire electrode can be monitored according to the operating time of the machine. Since the weight, length, and diameter of the wire wound on the bobbin are settled, the remaining lifetime of the wire electrode can be more strictly monitored based on these data and the feed rate of the wire that varies depending on each machining condition.

<Wire Remaining Lifetime Monitoring Unit 11>

The wire remaining lifetime monitoring unit 11 monitors the remaining lifetime and remaining amount of the wire electrode and outputs the remaining lifetime. The remaining lifetime of the wire electrode may be monitored in the following manner.

(1) The preset lifetime of the wire electrode is compared with the operating time of the machine after replacement with a new wire electrode.

(2) The consumption of the wire electrode is measured based on various set values (weight, length, diameter, feed rate, etc., of the wire) of the wire electric discharge machine, and the time for the full consumption of the wire electrode is estimated.

Further, the remaining lifetime and remaining amount of the wire electrode may be monitored by using the means disclosed in Japanese Patent Application Laid-Open No. 2010-179377 or 2003-25155.

<Electric Discharge Machining Time Calculation Unit 12>

The electric discharge machining time calculation unit 12 analyzes the machining program, calculates, before the start of electric discharge, the electric discharge machining time in the machining interval before the electric discharge is stopped next, and outputs the electric discharge machining time. The analysis of the machining program and the calculation of the electric discharge machining time are performed in the following manner.

EXAMPLE 1

Figure 2:
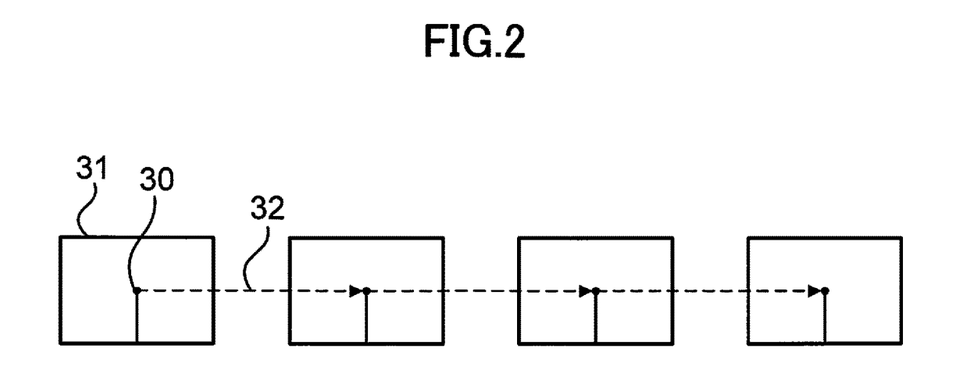
FIG. 2 is a diagram showing workpiece machining based on machining programs shown in FIG. 3.
Figure 3:
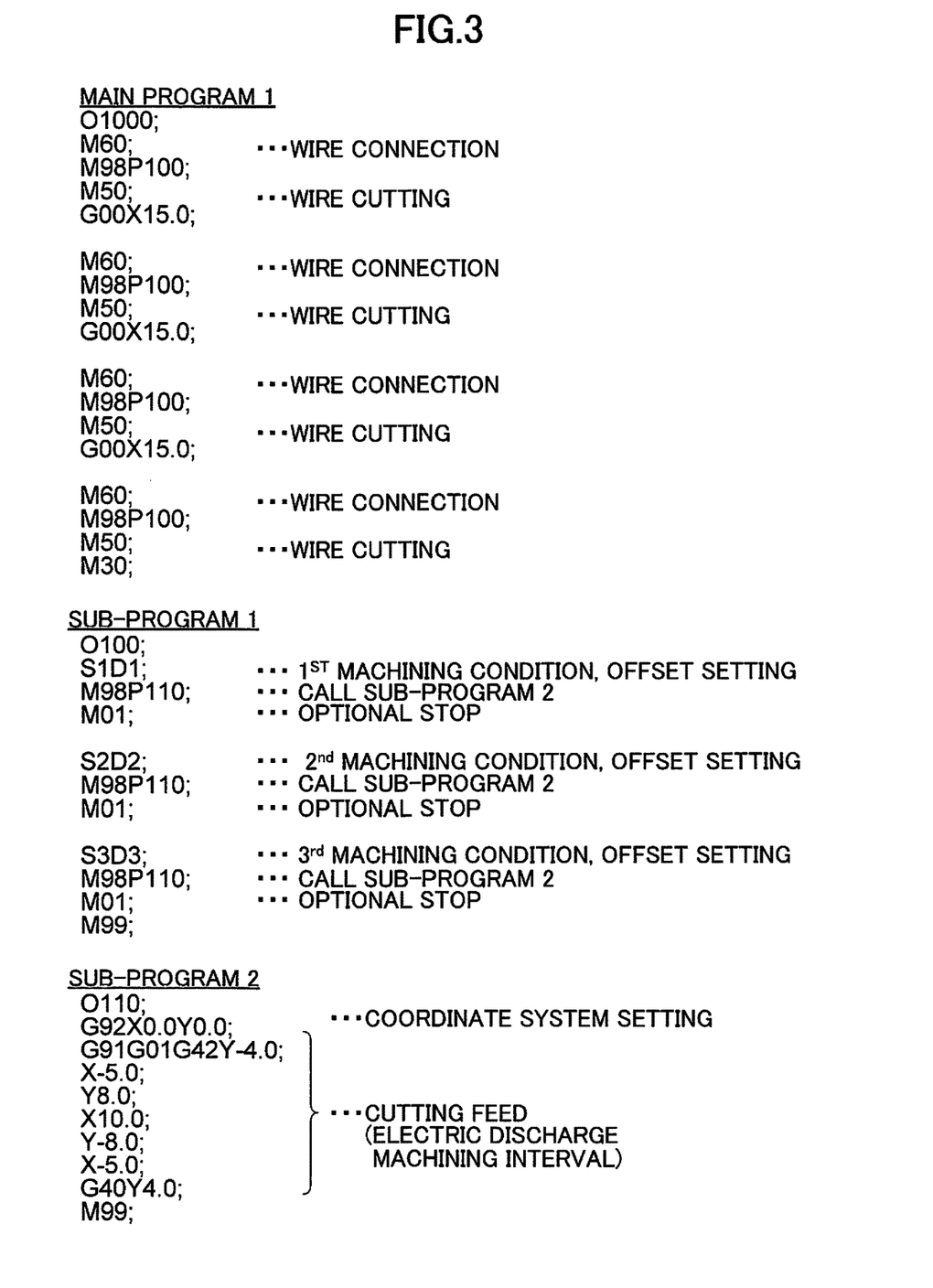
FIG. 3 is a diagram showing examples of the machining programs such that machining is repeated three times.

FIG. 2 is a diagram showing workpiece machining based on machining programs shown in FIG. 3. FIG. 3 is a diagram showing examples of the machining programs such that machining is repeated three times.

The wire electrode is moved relative to the workpiece along a machining path 31 from a machining start point 30 as the machining is performed. When the wire electrode returns to the machining start point 30, the wire is cut, and the workpiece and a wire guide supporting the wire electrode are relatively moved by rapid traverse 32 and positioned at the next machining point. Thereupon, the machining is started.

In the case where the machining is repeated three times, as shown in FIGS. 2 and 3, electric discharge machining is performed in an interval for cutting feed in which G01 is commanded in the machining program. problem occurs that the machined surface quality is degraded if electric discharge is suspended in this interval. Therefore, the machining time in this interval is calculated before G01 is commanded.

Specifically, the length of this interval can be obtained from a movement command by G01, and the machining time in this interval can be calculated based on a set machining speed included in machining conditions ordered by an S-code command and the interval length. It is necessary, therefore, only that this processing be repeated every time this interval is called.

In this example, moreover, the G01 command is monitored as the machining time is calculated. Alternatively, however, a dedicated M code may be provided such that machining times in subsequent electric discharge machining intervals can be calculated.

In the case of such machining, an operator conventionally replaces the wire electrode with the program operation suspended after the end of the electric discharge machining interval by using an optional stop command of M01 while monitoring the remaining lifetime of the wire electrode.

EXAMPLE 2

Figure 4:
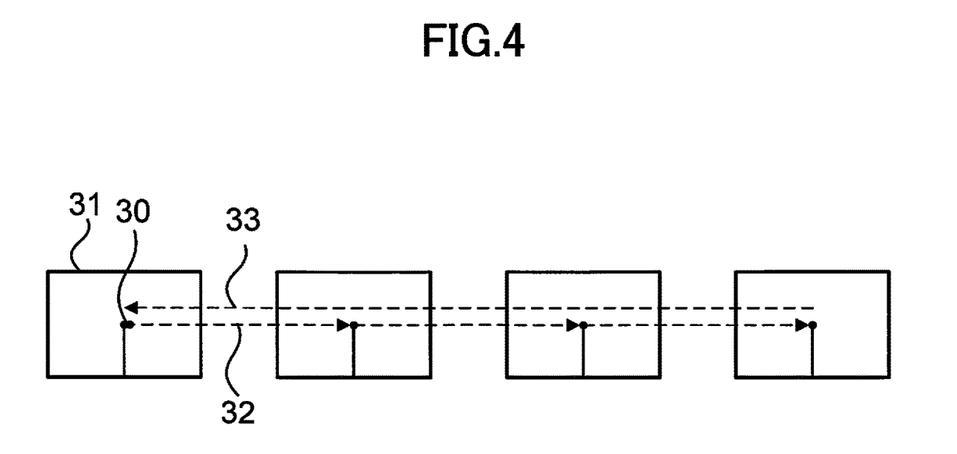
FIG. 4 is a diagram showing workpiece machining based on machining programs shown in FIG. 5.
Figure 5:
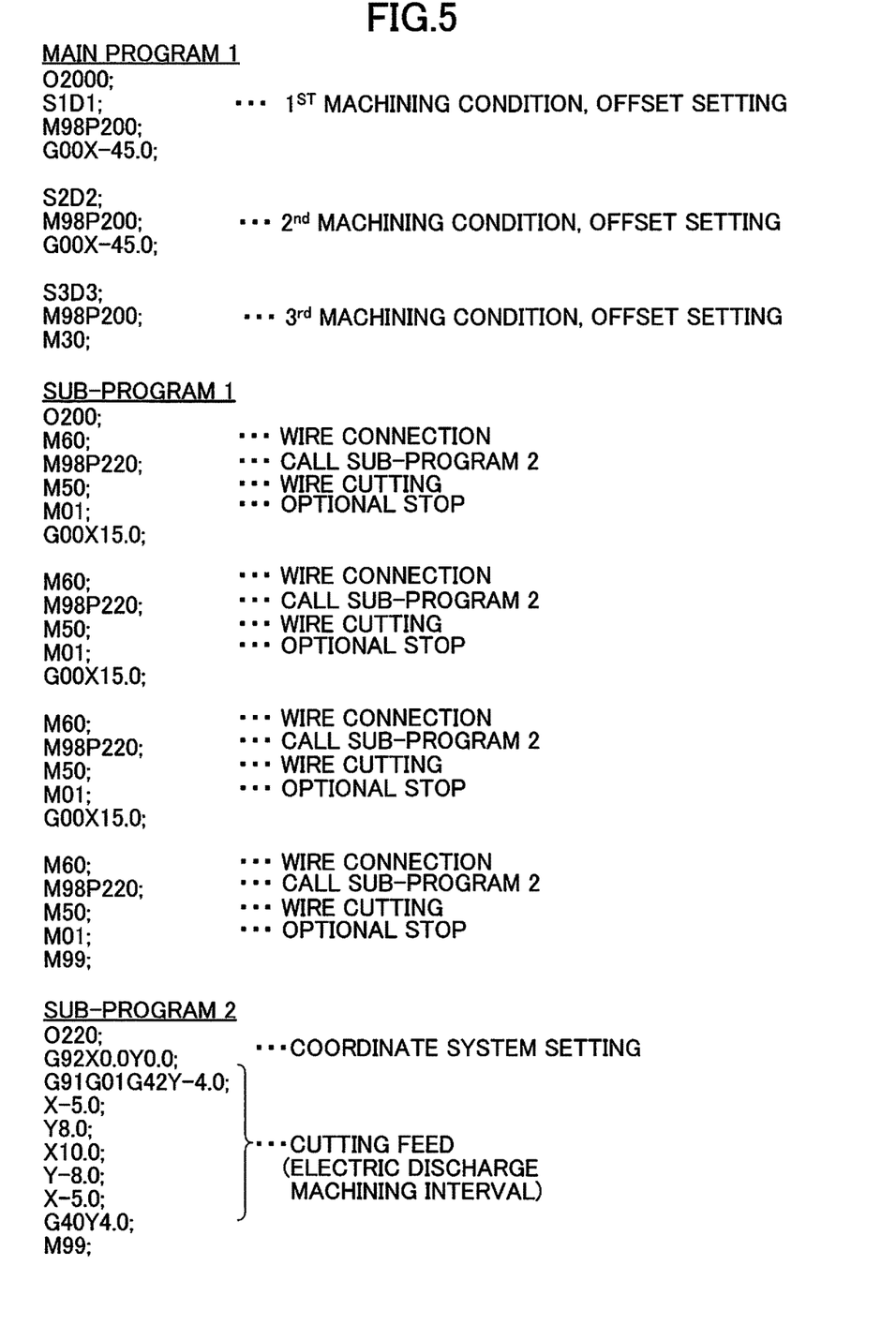
FIG. 5 is a diagram showing alternative examples of the machining programs such that machining is repeated three times.

In another example, machining based on machining programs set up in the manner shown in FIGS. 4 and 5 is repeated three times.

Although the machining shape is the same as that in Example 1, the machining programs may be set up in this manner depending on the machining content. The wire electrode is moved relative to the workpiece along the machining path 31 from the machining start point 30 as the machining is performed. When the wire electrode returns to the machining start point 30, the wire is cut, and the workpiece and the wire guide supporting the wire electrode are relatively moved by the rapid traverse 32 and positioned at the next machining point. Thereupon, the machining is started. When the machining of the last region is finished, the wire electrode returns to the first machining start point 30 by rapid traverse 33.

Also in this case, electric discharge machining is performed in the interval for cutting feed in1 which G01 is commanded in the machining program. The problem occurs that the machined surface quality is degraded if electric discharge is suspended in this interval. Therefore, the machining time in this interval is calculated before G01 is commanded.

Specifically, the length of this interval can be obtained from the movement command by G01, and the machining time in this interval can be calculated based on the set machining speed included in the machining conditions ordered by the S-code command and the interval length. It is necessary, therefore, only that this processing be repeated every time this interval is called. In this example, moreover, the G01 command is monitored as the machining time is calculated. As in the case of Example 1, however, the dedicated M code may be provided such that the machining times in the subsequent electric discharge machining intervals can be calculated.

Also in the case of such machining, the operator conventionally replaces the wire electrode with the program operation suspended after the end of the electric discharge machining interval by using the optional stop command of M01 while monitoring the remaining lifetime of the wire electrode.

<Wire Electrode Replacement Timing Determination Unit 13>

The wire electrode replacement timing determination unit 13 compares the remaining lifetime of the wire electrode received from the wire remaining lifetime monitoring unit 11 and the electric discharge machining time received from the electric discharge machining time calculation unit 12 to determine the timing of replacement of the wire electrode and outputs the result of the determination. Specifically, it may be determined that the timing of replacement of the wire electrode is reached if (remaining lifetime)/(electric discharge machining time)<a (a is a constant) is given, or that the timing of replacement of the wire electrode is not reached if (remaining lifetime)/(electric discharge machining time)>a is given. Although a is normally 1, it may be a predetermined value obtained by multiplication by a safety factor.

Alternatively, it may be determined that the replacement timing for the wire electrode is reached if (remaining lifetime)<(electric discharge machining time) is given, or that the replacement timing for the wire electrode is not reached if (remaining lifetime)>(electric discharge machining time) is given. Alternatively, moreover, it may be determined that the replacement timing for the wire electrode is reached if (remaining lifetime)−(electric discharge machining time)<b (b is a constant) is given, or that the replacement timing for the wire electrode is not reached if (remaining lifetime)−(electric discharge machining time)>b. Although b is normally 0, it may be set to a value other than 0 in anticipation of safety.

<Program Operation Stop Command Unit 14>

The program operation stop command unit 14 outputs a program operation stop command to the program operation control unit 16 if the determination result received from the wire electrode replacement timing determination unit 13 indicates that the replacement timing is reached.

<Program Operation Restart Command Unit 15>

The program operation restart command unit 15 outputs a program operation restart command to the program operation control unit 16 after the connection of the wire electrode is completed.

<Program Operation Control Unit 16>

The program operation control unit 16 executes the machining program to control the program operation. On receiving the program operation stop command from the program operation stop command unit 14, the program operation control unit 16 stops the program operation. On receiving the program operation restart command, it restarts the program operation.

<Wire Cutting Control Unit 17>

If the determination result received from the wire electrode replacement timing determination unit 13 indicates that the replacement timing is reached, the wire cutting control unit 17 outputs a wire electrode cutting command to the wire cutting unit 20 and confirms the completion of cutting of the wire electrode. The cutting command may alternatively be output after the stop of the program operation is confirmed.

<Wire Electrode Replacement Control Unit 18>

If the determination result received from the wire electrode replacement timing determination unit 13 indicates that the replacement timing for the wire electrode is reached, the wire electrode replacement control unit 18 outputs a wire electrode replacement command to the wire electrode replacement unit 21 and confirms the completion of replacement of the wire electrode. The replacement command may alternatively be output after the cutting of the program operation is confirmed.

<Wire Connection Control Unit 19>

The wire connection control unit 19 outputs the wire electrode connection command to the wire connection unit 22 and confirms the completion of connection of the wire electrode after the replacement of the wire electrode is completed.

<Wire Cutting Unit 20>

The wire cutting unit 20 cuts the wire electrode on receiving the wire electrode cutting command from the wire cutting control unit 17.

<Wire Electrode Replacement Unit 21>

The wire electrode replacement unit 21 replaces the wire electrode on receiving the wire electrode replacement command from the wire electrode replacement control unit 18. An industrial robot may be used as the wire electrode replacement unit 21.

<Wire Connection Unit 22>

The wire connection unit 22 connects the wire electrode on receiving the wire electrode connection command from the wire connection control unit 19.

Figure 1:
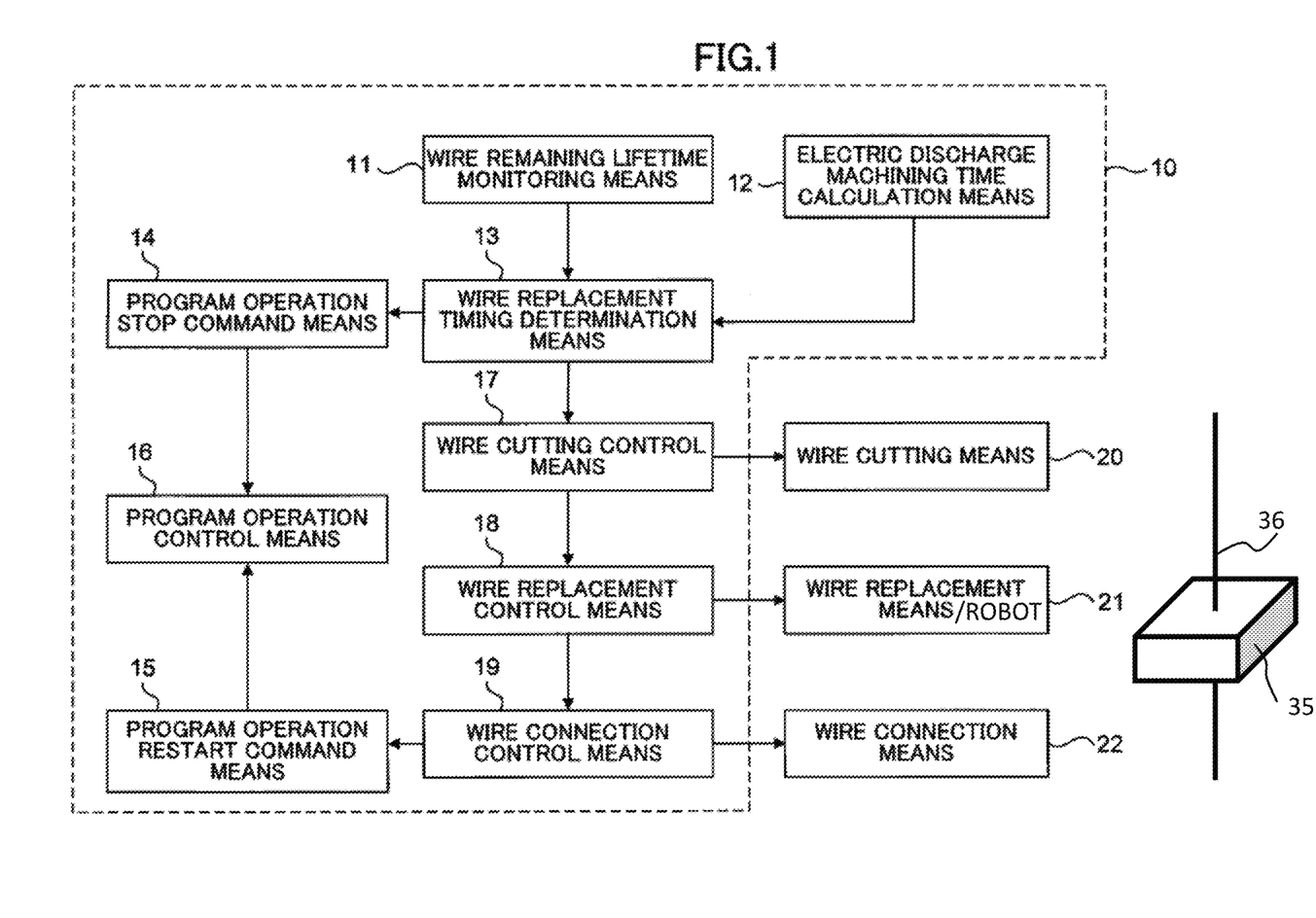
FIG. 1 is a block diagram showing one embodiment of a wire electric discharge machine controller having a wire electrode replacement function according to the present invention.
Figure 6:
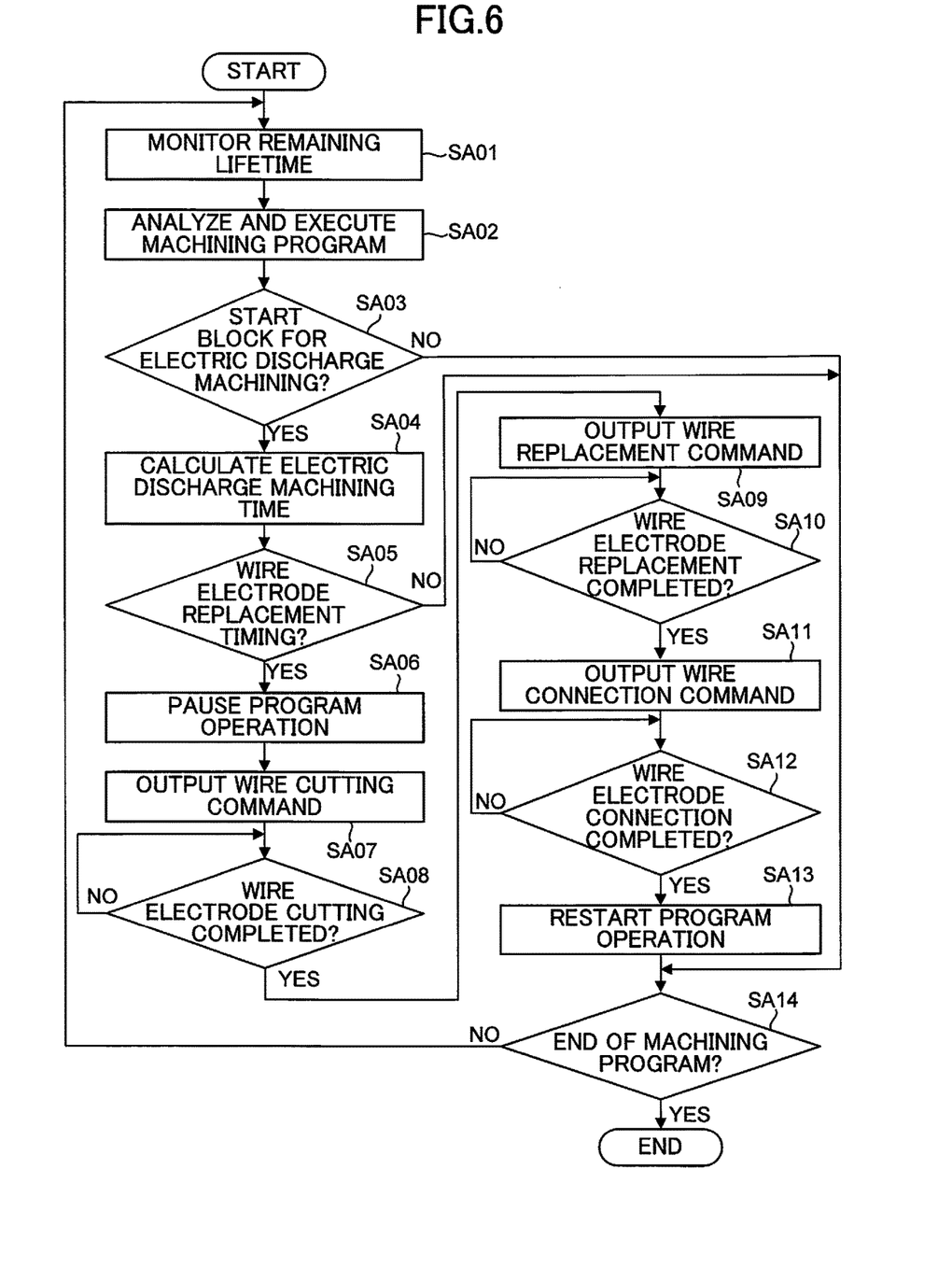
FIG. 6 is a flowchart showing control of the wire electric discharge machine controller of FIG. 1.

FIG. 6 is a flowchart showing control of the wire electric discharge machine controller of FIG. 1. The following is a sequential description of various steps of operation.

[Step sa01] Monitoring of the remaining lifetime of the wire electrode is started.

[Step sa02] The machining program is analyzed and executed.

[Step sa03] It is determined whether or not a block in the machining program is a start block for electric discharge machining. If the block is the start block for electric discharge machining (YES), the processing proceeds to Step sa04. If not (NO), the processing proceeds to Step sa14.

[Step sa04] The electric discharge machining time is calculated.

[Step sa05] It is determined whether or not the wire electrode replacement timing is reached. If it is determined that the replacement timing is reached (YES), the processing proceeds to Step sa06. If not (NO), the processing proceeds to Step sa14.

[Step sa06] The program operation is paused.

[Step sa07] The wire cutting command is output.

[Step sa08] It is determined whether or not the wire electrode cutting is completed. If the cutting is completed (YES), the processing proceeds to Step sa09. If not (NO), the processing proceeds to Step sa09 after completion of the wire electrode cutting is awaited.

[Step sa09] The wire electrode replacement command is output.

[Step sa10] It is determined whether or not the wire electrode replacement is completed. If the replacement is completed (YES), the processing proceeds to Step sa11. If not (NO), the processing proceeds to Step sa11 after completion of the wire electrode replacement is awaited.

[Step sa11] The wire electrode connection command is output.

[Step sa12] It is determined whether or not the wire electrode connection is completed. If the connection is completed (YES), the processing proceeds to Step sa13. If not (NO), the processing proceeds to Step sa13 after completion of the wire electrode connection is awaited.

[Step sa13] The program operation is restarted.

[Step sa14] It is determined whether or not the machining program is terminated. If the machining program is terminated (YES), this control processing ends. If not (NO), the processing returns to Step sa01, whereupon the control processing is continued.

The invention claimed is:

1. A wire electric discharge machine, comprising:
   a wire electrode with predetermined weight, length, and wound diameter;
   a wire electrode cutting unit;
   a wire electrode replacement unit;
   a wire connection unit; and
   a controller configured to create a machining path based on an axis movement command from a machining program and control the wire electric discharge machine to perform a program operation according to the machining program to move the wire electrode and a workpiece relative to each other along the created machining path,
   wherein the controller is configured to
      execute the machining program;
      monitor the remaining lifetime of the wire electrode based on physical values of the wire electrode wire;
      analyze the machining program and calculate, before a start of electric discharge between the wire electrode and the workpiece in accordance with the machining program, an electric discharge machining time in a machining interval from (i) the start of the electric discharge to (ii) a stop of the electric discharge, wherein the machining program includes, in the machining interval, a plurality of commands controlling the wire electrode to cut the workpiece;
      compare the remaining lifetime and the electric discharge machining time, determined based on physical values of the wire electrode wire and determine that the timing of replacement of the wire electrode is reached when the remaining lifetime of the wire electrode is shorter than the electric discharge machining time;
      output a stop command for the program operation to a program operation control unit when the timing of replacement for the wire electrode is reached;
      output a cutting command for the wire electrode to the wire electrode cutting unit and monitor the completion of cutting of the wire electrode;
      output a replacement command for the wire electrode to the wire electrode replacement unit that automatically replaces the wire electrode on receiving the replacement command and monitor the completion of replacement of the wire electrode;
      output a connection command for the wire electrode to the wire connection unit and monitor the completion of connection of the wire electrode by the wire connection unit when the replacement of the wire electrode is completed; and
      output a restart command for the program operation to the program operation control unit when the connection of the wire electrode is completed,
   wherein the comparison of the remaining lifetime of the wire electrode and the electric discharge machining time is performed during execution of the machining interval, which is an interval occurring prior in time to the start of the machining interval during which the end of the remaining lifetime of the wire electrode is determined to occur.

2. The wire electric discharge machine according to claim 1, wherein
   controller is configured to
      calculate a ratio between the remaining lifetime and the electric discharge machining time, and
      determine that the timing of replacement of the wire electrode is reached when the calculated ratio is smaller than a predetermined value.

3. The wire electric discharge machine according to claim 1, wherein
   the controller is configured to
      calculate a difference between the remaining lifetime and the electric discharge machining time, and
      determine that the timing of replacement of the wire electrode is reached when the calculated difference is smaller than a predetermined value.

4. The wire electric discharge machine-according to claim 1, wherein the wire electrode replacement unit is a robot.

5. The wire electric discharge machine according to claim 1, wherein the machining interval is started by a G01 command in the machining program.

* * * * *